(12) United States Patent
Ulmer et al.

(10) Patent No.: US 10,520,769 B2
(45) Date of Patent: Dec. 31, 2019

(54) EMISSIVE DISPLAY WITH PRINTED LIGHT MODIFICATION STRUCTURES

(71) Applicant: eLux Inc., Camas, WA (US)

(72) Inventors: Kurt Ulmer, Vancouver, WA (US); Jong-Jan Lee, Camas, WA (US); Kenji Sasaki, West Linn, OR (US); Paul J. Schuele, Washougal, WA (US)

(73) Assignee: eLux, Inc., Vancouver, WA (US)

( * ) Notice: Subject to any disclaimer, the term of this patent is extended or adjusted under 35 U.S.C. 154(b) by 95 days.

(21) Appl. No.: 15/413,053

(22) Filed: Jan. 23, 2017

(65) Prior Publication Data

US 2017/0139276 A1 May 18, 2017

Related U.S. Application Data

(63) Continuation-in-part of application No. 15/412,731, filed on Jan. 23, 2017, which is a continuation-in-part
(Continued)

(51) Int. Cl.
*G02F 1/00* (2006.01)
*G02F 1/13357* (2006.01)

(52) U.S. Cl.
CPC .. *G02F 1/133603* (2013.01); *G02F 1/133606* (2013.01); *G02F 1/133621* (2013.01);
(Continued)

(58) Field of Classification Search
CPC ......... G02F 1/133603; G02F 1/133606; G02F 1/133621; G02F 2001/133614;
(Continued)

(56) References Cited

U.S. PATENT DOCUMENTS 5,545,291 A  8/1996 Smith et al.
5,594,463 A  1/1997 Sakamoto
(Continued)

OTHER PUBLICATIONS

US 8,093,720, 1/2012, Sony (withdrawn)
U.S. Appl. No. 14/305,295, pending, LED Display Driving Circuits.

*Primary Examiner* — Y M. Lee
(74) *Attorney, Agent, or Firm* — Law Office of Gerald Maliszewski; Gerald Maliszewski

(57) ABSTRACT

A multi-color emissive display is presented with printed light modifier structures. A fabrication method provides an emissive substrate with a plurality of wells formed in the emissions substrate top surface, and a plurality of emissive elements populating the wells. The method prints light modifier structures overlying the emissive elements. Some examples of light modifier material include light scattering materials, phosphors, and quantum dots. In one aspect, the emissive substrate wells have a first shape, with sidewalls and a first perimeter. Likewise, the emissive elements have the first shape, with sides and a second perimeter, less than the first perimeter. The light modifier structures fill the space between the emissive element sides and the well sidewalls with light modifier material. If the first shape is circular, the method prints the light modifier structures overlying the emissive elements in the circular shape having a first diameter defined by the well sidewalls.

19 Claims, 6 Drawing Sheets

Related U.S. Application Data of application No. 15/410,195, filed on Jan. 19, 2017, which is a continuation-in-part of application No. 15/410,001, filed on Jan. 19, 2017, now Pat. No. 9,825,202, which is a continuation-in-part of application No. 14/749,569, filed on Jun. 24, 2015, now Pat. No. 9,722,145, and a continuation-in-part of application No. 15/221,571, filed on Jul. 27, 2016, now Pat. No. 9,755,110, and a continuation-in-part of application No. 15/197,266, filed on Jun. 29, 2016, and a continuation-in-part of application No. 15/190,813, filed on Jun. 23, 2016, now Pat. No. 9,892,944, and a continuation-in-part of application No. 15/158,556, filed on May 19, 2016, now Pat. No. 9,985,190, and a continuation-in-part of application No. 15/266,796, filed on Sep. 15, 2016, now Pat. No. 9,917,226, and a continuation-in-part of application No. 14/680,618, filed on Apr. 7, 2015, now Pat. No. 10,115,862, which is a continuation-in-part of application No. 14/530,230, filed on Oct. 31, 2014, now abandoned.

(52) U.S. Cl.
CPC ............ *G02F 2001/133614* (2013.01); *G02F 2202/36* (2013.01)

(58) Field of Classification Search
CPC ......... G02F 1/133602; G02F 1/133609; G02F 2001/133607; G02F 2202/36
See application file for complete search history.

(56) References Cited

U.S. PATENT DOCUMENTS

| | | |
|---|---|---|
| 5,824,186 A | 10/1998 | Smith et al. |
| 5,904,545 A | 5/1999 | Smith et al. |
| 6,274,508 B1 | 8/2001 | Jacobsen et al. |
| 6,281,038 B1 | 8/2001 | Jacobsen et al. |
| 6,316,278 B1 | 11/2001 | Jacobsen et al. |
| 6,417,025 B1 | 7/2002 | Gengel |
| 6,420,266 B1 | 7/2002 | Smith et al. |
| 6,468,638 B2 | 10/2002 | Jacobsen et al. |
| 6,479,395 B1 | 11/2002 | Smith et al. |
| 6,527,964 B1 | 3/2003 | Smith et al. |
| 6,555,408 B1 | 4/2003 | Jacobsen et al. |
| 6,566,744 B2 | 5/2003 | Gengel |
| 6,586,338 B2 | 7/2003 | Smith et al. |
| 6,590,346 B1 | 7/2003 | Hadley et al. |
| 6,606,247 B2 | 8/2003 | Credelle et al. |
| 6,613,610 B2 | 9/2003 | Iwafuchi et al. |
| 6,618,030 B2 | 9/2003 | Kane et al. |
| 6,623,579 B1 | 9/2003 | Smith et al. |
| 6,657,289 B1 | 12/2003 | Craig et al. |
| 6,665,044 B1 | 12/2003 | Jacobsen et al. |
| 6,683,663 B1 | 1/2004 | Hadley et al. |
| 6,687,987 B2 | 2/2004 | Mayer et al. |
| 6,723,576 B2 | 4/2004 | Nozawa et al. |
| 6,731,353 B1 | 5/2004 | Credelle et al. |
| 6,780,696 B1 | 8/2004 | Schatz |
| 6,816,380 B2 | 11/2004 | Credelle et al. |
| 6,825,499 B2 | 11/2004 | Nakajima et al. |
| 6,850,312 B2 | 2/2005 | Jacobsen et al. |
| 6,863,219 B1 | 3/2005 | Jacobsen et al. |
| 6,870,190 B2 | 3/2005 | Okuyama et al. |
| 6,919,225 B2 | 7/2005 | Craig et al. |
| 6,927,085 B2 | 8/2005 | Hadley et al. |
| 6,980,184 B1 | 12/2005 | Stewart et al. |
| 6,984,927 B2 | 1/2006 | Tomoda et al. |
| 6,985,361 B2 | 1/2006 | Credelle et al. |
| 7,046,328 B2 | 5/2006 | Jacobsen et al. |
| 7,049,207 B2 | 5/2006 | Tomoda |
| 7,049,227 B2 | 5/2006 | Tomoda et al. |
| 7,060,542 B2 | 6/2006 | Nakajima et al. |
| 7,070,851 B2 | 7/2006 | Jacobsen et al. |
| 7,080,444 B1 | 7/2006 | Craig et al. |
| 7,087,934 B2 | 8/2006 | Oohata et al. |
| 7,101,502 B2 | 9/2006 | Smith et al. |
| 7,113,250 B2 | 9/2006 | Jacobsen et al. |
| 7,122,826 B2 | 10/2006 | Okuyama et al. |
| 7,129,514 B2 | 10/2006 | Okuyama et al. |
| 7,141,176 B1 | 11/2006 | Smith et al. |
| 7,172,789 B2 | 2/2007 | Smith et al. |
| 7,179,210 B2 | 2/2007 | Soukeras |
| 7,199,527 B2 | 4/2007 | Holman et al. |
| 7,244,326 B2 | 7/2007 | Craig et al. |
| 7,250,314 B2 | 7/2007 | Nakajima et al. |
| 7,250,320 B2 | 7/2007 | Okuyama et al. |
| 7,260,882 B2 | 8/2007 | Credelle et al. |
| 7,288,432 B2 | 10/2007 | Jacobsen et al. |
| 7,317,211 B2 | 1/2008 | Watanabe et al. |
| 7,317,435 B2 | 1/2008 | Hsueh |
| 7,321,159 B2 | 1/2008 | Schatz |
| 7,353,598 B2 | 4/2008 | Craig et al. |
| 7,417,306 B1 | 8/2008 | Jacobsen et al. |
| 7,425,467 B2 | 9/2008 | Jacobsen et al. |
| 7,452,748 B1 | 11/2008 | Craig et al. |
| 7,500,610 B1 | 3/2009 | Hadley et al. |
| 7,531,218 B2 | 5/2009 | Smith et al. |
| 7,542,301 B1 | 6/2009 | Liong et al. |
| 7,561,221 B2 | 7/2009 | Jacobsen et al. |
| 7,564,064 B2 | 7/2009 | Oohata et al. |
| 7,572,649 B2 | 8/2009 | Kanemitsu et al. |
| 7,573,194 B2 | 8/2009 | Doi et al. |
| 7,576,656 B2 | 8/2009 | Craig et al. |
| 7,589,355 B2 | 9/2009 | Tomoda et al. |
| 7,615,479 B1 | 11/2009 | Craig et al. |
| 7,619,598 B2 | 11/2009 | Pulvirenti et al. |
| 7,662,008 B2 | 2/2010 | Hillis et al. |
| 7,763,901 B2 | 7/2010 | Tomoda |
| 7,774,929 B2 | 8/2010 | Jacobs |
| 7,795,049 B2 | 9/2010 | Watanabe et al. |
| 7,795,629 B2 | 9/2010 | Watanabe et al. |
| 7,838,410 B2 | 11/2010 | Hirao et al. |
| 7,880,184 B2 | 2/2011 | Iwafuchi et al. |
| 7,884,543 B2 | 2/2011 | Doi |
| 7,888,690 B2 | 2/2011 | Iwafuchi et al. |
| 7,931,063 B2 | 4/2011 | Craig et al. |
| 7,968,474 B2 | 6/2011 | Martin et al. |
| 7,977,130 B2 | 7/2011 | Hillis et al. |
| 8,101,457 B2 | 1/2012 | Tomoda et al. |
| 8,222,659 B2 | 7/2012 | Tomoda |
| 8,232,640 B2 | 7/2012 | Tomoda et al. |
| 8,252,164 B2 | 8/2012 | Martin et al. |
| 8,257,538 B2 | 9/2012 | Doi et al. |
| 8,284,120 B2 | 10/2012 | Hillis et al. |
| 8,300,007 B2 | 10/2012 | Hillis et al. |
| 8,312,619 B2 | 11/2012 | Chow et al. |
| 8,333,860 B1 | 12/2012 | Bibl et al. |
| 8,349,116 B1 | 1/2013 | Bibl et al. |
| 8,361,268 B2 | 1/2013 | Mizuno et al. |
| 8,361,297 B2 | 1/2013 | Mayer et al. |
| 8,379,003 B2 | 2/2013 | Kawaguchi et al. |
| 8,382,544 B2 | 2/2013 | Hillis et al. |
| 8,383,506 B1 | 2/2013 | Golda et al. |
| 8,384,116 B2 | 2/2013 | Ohtorii et al. |
| 8,390,537 B2 | 3/2013 | Hillis et al. |
| 8,409,886 B2 | 4/2013 | Iwafuchi et al. |
| 8,415,767 B1 | 4/2013 | Golda et al. |
| 8,415,768 B1 | 4/2013 | Golda et al. |
| 8,415,771 B1 | 4/2013 | Golda et al. |
| 8,415,879 B2 | 4/2013 | Lowenthal et al. |
| 8,426,227 B1 | 4/2013 | Bibl et al. |
| 8,476,826 B2 | 7/2013 | Oohata et al. |
| 8,518,204 B2 | 8/2013 | Hu et al. |
| 8,552,436 B2 | 10/2013 | Bibl et al. |
| 8,558,243 B2 | 10/2013 | Bibl et al. |
| 8,569,115 B1 | 10/2013 | Golda et al. |
| 8,570,482 B2 | 10/2013 | Hillis et al. |
| 8,573,469 B2 | 11/2013 | Hu et al. |
| 8,628,994 B2 | 1/2014 | Tomoda |
| 8,646,505 B2 | 2/2014 | Bibl et al. |
| 8,648,328 B2 | 2/2014 | Crowder et al. |

(56) References Cited

U.S. PATENT DOCUMENTS

| | | |
|---|---|---|
| 8,669,703 B2 | 3/2014 | Hillis et al. |
| 8,683,416 B1 | 3/2014 | Trivedi et al. |
| 8,685,774 B2 | 4/2014 | Crowder et al. |
| 8,686,447 B2 | 4/2014 | Tomoda et al. |
| 8,686,542 B2 | 4/2014 | Golda et al. |
| 8,711,063 B2 | 4/2014 | Hillis et al. |
| 8,789,573 B2 | 7/2014 | Bibl et al. |
| 8,809,126 B2 | 8/2014 | Lowenthal et al. |
| 8,846,457 B2 | 9/2014 | Lowenthal et al. |
| 8,906,713 B2 | 12/2014 | Rettke |
| 9,240,397 B2 | 1/2016 | Bibl et al. |
| 9,252,375 B2 | 2/2016 | Bibl et al. |
| 9,269,322 B2 | 2/2016 | Nathan et al. |
| 9,293,476 B2 | 3/2016 | Bedell et al. |
| 9,305,807 B2 | 4/2016 | Whiting et al. |
| 9,318,475 B2 | 4/2016 | Bibl et al. |
| 9,343,448 B2 | 5/2016 | Sakariya et al. |
| 2002/0153606 A1 | 10/2002 | Gengel |
| 2005/0206585 A1 | 9/2005 | Stewart et al. |
| 2005/0233504 A1 | 10/2005 | Doi et al. |
| 2008/0211993 A1* | 9/2008 | Toyama ............ G02F 1/133603 349/69 |
| 2009/0262520 A1* | 10/2009 | Park ..................... F21K 9/00 362/97.1 |
| 2010/0186883 A1 | 7/2010 | Tomoda |
| 2011/0266039 A1 | 11/2011 | Tomoda |
| 2011/0273410 A1 | 11/2011 | Park et al. |
| 2012/0169786 A1 | 7/2012 | Okuyama et al. |
| 2012/0170253 A1* | 7/2012 | Park ................. G02F 1/133608 362/97.1 |
| 2012/0218318 A1 | 8/2012 | Hirao et al. |
| 2012/0223875 A1* | 9/2012 | Lau .......................... G09G 3/32 257/E33.059 |
| 2013/0126098 A1 | 5/2013 | Bibl et al. |
| 2013/0126827 A1 | 5/2013 | Bibl et al. |
| 2013/0128585 A1 | 5/2013 | Bibl et al. |
| 2013/0210194 A1 | 8/2013 | Bibl et al. |
| 2014/0008691 A1 | 1/2014 | Tomoda et al. |
| 2014/0048909 A1 | 2/2014 | Golda et al. |
| 2014/0084482 A1 | 3/2014 | Hu et al. |
| 2014/0131743 A1* | 5/2014 | Jiang .................. H01L 27/3246 257/88 |
| 2015/0036316 A1* | 2/2015 | Lin ........................... F21V 9/30 362/84 |
| 2015/0179877 A1 | 6/2015 | Hu et al. |
| 2015/0263066 A1 | 9/2015 | Hu et al. |
| 2015/0338065 A1* | 11/2015 | Wang ....................... F21V 9/30 362/97.1 |
| 2016/0086534 A1 | 3/2016 | Seo et al. |

* cited by examiner

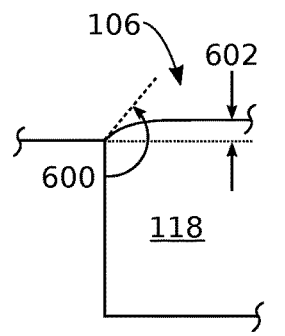 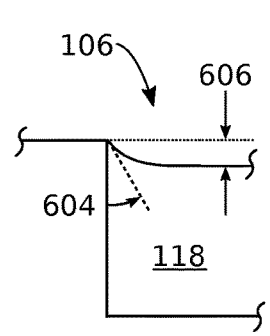 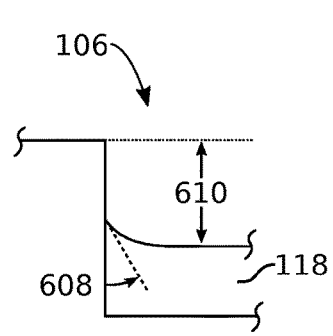
Fig. 6A  Fig. 6B  Fig. 6C
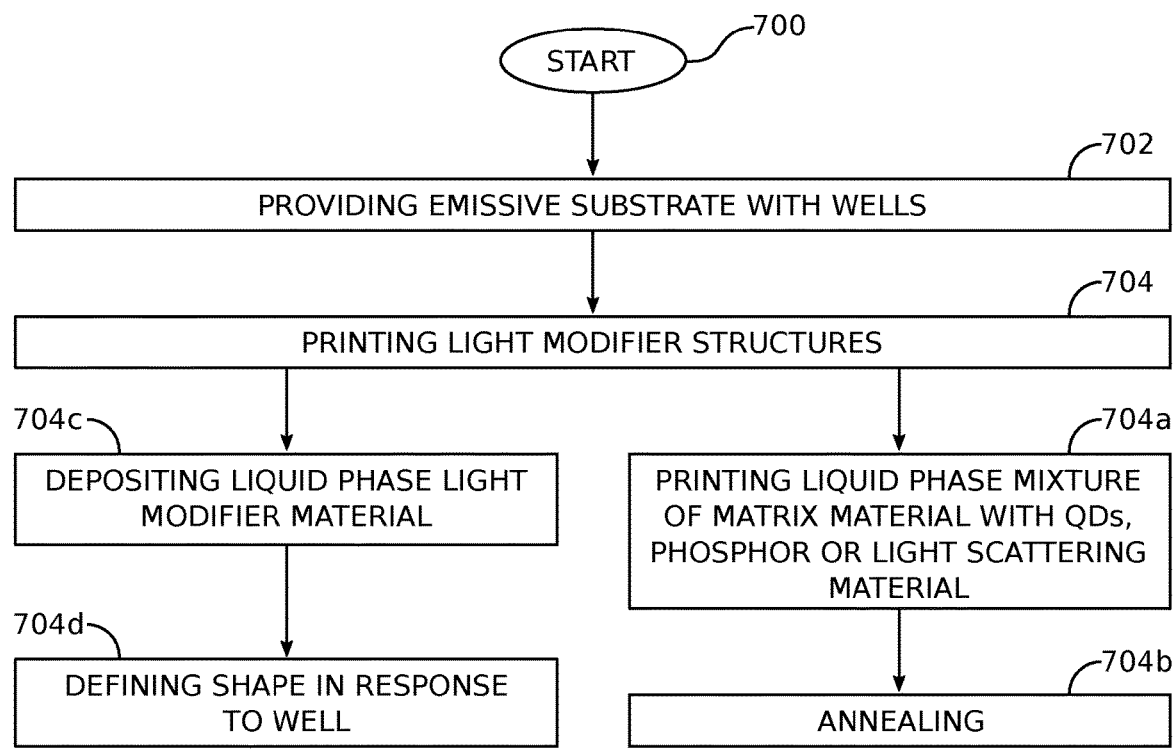
Fig. 7

EMISSIVE DISPLAY WITH PRINTED LIGHT MODIFICATION STRUCTURES

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to emissive displays and, more particularly, to a system and method for printing light modification structure over an emissive display made from micro-size emissive elements positioned in substrate wells.

2. Description of the Related Art

A red-green-blue (RGB) display can be made with micro-sized emissive elements, such as a micro light emitting diode (µLED). Such a display might be used in a television, computer monitor, or handheld device. Micro-sized emissive elements may have a diameter or cross-section of less than 100 microns. The emissive elements are aligned in some manner into pixel arrays. Conventional processing and integration steps following the placement of emissive elements include metallization to connect the emissive elements to a matrix of control lines.

If the display is fabricated using a fluidic fabrication process, the emissive (light creating) substrate may be formed with an array of wells to capture the emissive elements. Typically, the emissive substrate is made of a transparent material such as glass. Although a direct emissions substrate can be comprised of pixels made up of red, green, and blue LEDs, more typically, only one or two types of LEDs (i.e., two colors) are used, and the third (or any additional colors) are created by forming a color modifying material, such as a phosphor, over some of the LEDs to convert the color. Further, even LEDs with no overlying color modifier typically require a light diffuser layer to randomize the distribution of light. Conventionally, these light and color modifications layers must be formed in a separate substrate that is bonded to the emissive substrate, which adds complications and expense to the overall fabrication process.

It would be advantageous if light and color modification structures could be formed directly on the surface of the emissive substrate to avoid the use of a separate color modification substrate.

It would be advantageous of color and light modification structures could be directly printed on an emissive substrate top surface to the desired thickness, without concern for the modification materials spreading to adjacent sub-pixels (LEDs).

SUMMARY OF THE INVENTION

Disclosed herein are a system and method relating to the color conversion and scattering of the light generated from individually addressed emissive elements, such as micro-size light emitting diode (uLED) pixels, within a direct emission display. One method of making a full color display is to use blue light emitting LEDs for all subpixels, with color conversion elements to down-convert some portion of the blue emitting LED subpixels to red and green subpixels. This can be done with phosphors or quantum dots. The subpixel size for a high definition display type may nominally be the same size or smaller than conventional phosphor particle size (nitride phosphor) so a color conversion scheme utilizing quantum dots is advantageous. Additionally, QD advantages include better conversion efficiency and color emission in narrower wavelength bands, giving a wider color gamut than conventional phosphor. Specifically, when used with an emissive substrate made from emissive elements arrayed in substrate wells, the color conversion elements are contained within the well structure of a fluidically assembled display.

Accordingly, a multi-color emissive display fabrication method is presented. An emissive substrate is provided with a top surface, a plurality of wells formed in the emissions substrate top surface, and a plurality of emissive elements populating the wells. Each emissive element has a bottom surface. Note; the bottom surface is the surface exposed (facing "up") when the emissive element is positioned in the well. The emissive element top surface interfaces with the well bottom surface. The method prints a light modifier structures overlying the emissive element bottom surfaces. In some aspect inkjet printing is used. Some examples of light modifier material include light scattering materials, phosphors, and quantum dots (QDs).

In one aspect, the emissive substrate wells have a first shape, with sidewalls and a first perimeter. Likewise, the emissive elements have the first shape, with sides, and a second perimeter less than the first perimeter. In this aspect, printing the light modifier structures includes filling a space between the emissive element sides and the well sidewalls with light modifier material. If the first shape is circular, the method prints the light modifier structures overlying the emissive elements in the circular shape. As a result, the light modifier structures have a first diameter defined by the well sidewalls. If the light modifier material is deposited as a liquid, then the method confines the liquid phase light modifier material shape to the perimeter of the underlying well, although the shape may be modified by a combination of the surface energies of the liquid phase light modifier material, the emissive substrate top surface, and the ambient gas environment. If the emissive element and/or the well are not circular, the light modifier material assumes the shape of the well and completely encloses the emitting element by filling in the non-circular well. In contrast, ink printed on a conventional secondary light color conversion substrate, if unpatterned in some way, would be circular in shape as dictated by surface tension.

Additional details of the above-described method and a multi-color emissive display is provided below.

BRIEF DESCRIPTION OF THE DRAWINGS

FIGS. 6A through 6C are diagrams depicting the ink volume of a wettable liquid pinned against the edge of a structure.

FIG. 7 is a flowchart illustrating a multi-color emissive display fabrication method.

DETAILED DESCRIPTION

Figure 1A:
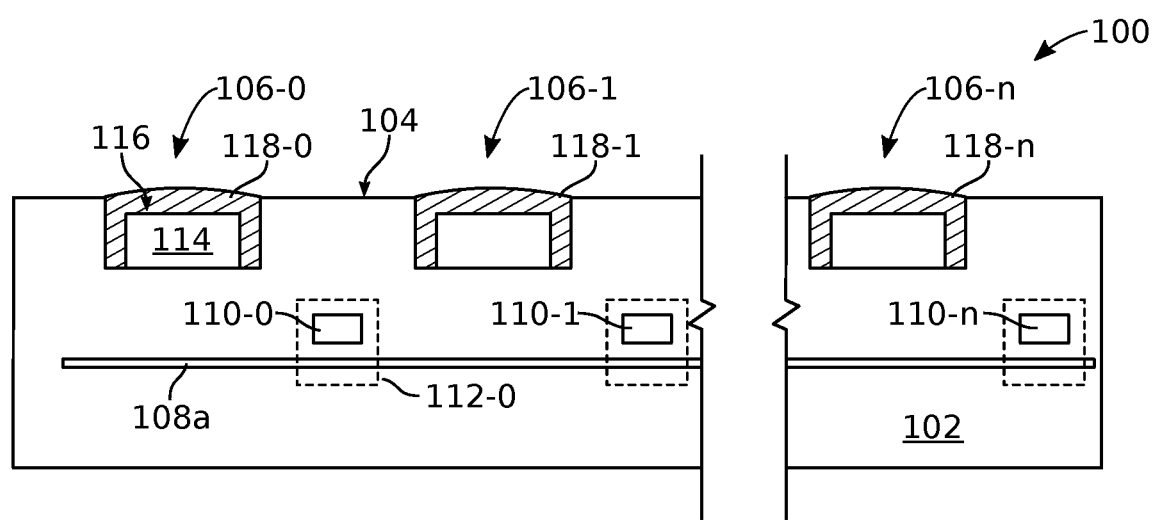
FIGS. 1A and 1B are partial cross-sectional views of a multi-color emissive display.
Figure 1B:
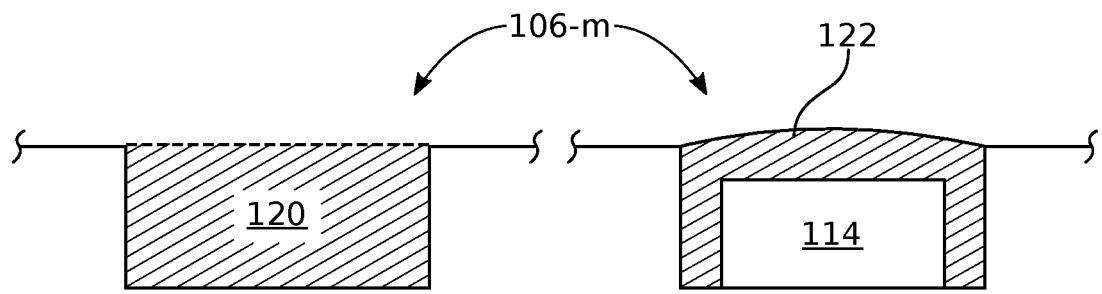

FIGS. 1A and 1B are partial cross-sectional views of a multi-color emissive display. The display 100 comprises an emissions substrate 102, which in turn comprises a top surface 104 and a plurality of wells formed in the emissions substrate top surface, see FIG. 1A. Shown are wells 106-0, 106-1, and 106-n, which might comprise a red-green-blue (RGB) pixel. It should be understood that a pixel may include more than three colors (sub-pixels), and that a large emissive display might be comprised of millions of such pixels. A matrix of column traces and row conductive traces form a first plurality of column/row intersections, where each column/row intersection is associated with a corresponding well. Shown are column trace 108a, row traces, 110-0, 110-1, and 110-n, associated with column/row intersections 112-0, 112-1, and 112-n (in phantom). A plurality of emissive elements 114 populate the wells 106-0 through 106-n. Each emissive element 114 has a bottom surface 116, which is the surface exposed (facing "up") when the emissive element is positioned in a well. Printed light modifier structures 118-0, 118-1, and 118-n overlie the corresponding emissive element bottom surfaces 116. The printed light modifier material (118-0 through 118-n) may be light scattering materials, phosphors, or quantum dots (QDs), as mixed in a matrix binder material. The light scattering material diffuses the light emitted from the emissive elements 114, without changing color. Some examples of light scattering material include high refractive index titanium oxide nanoparticles and high refractive index polymer spheres. Phosphors and QDs are well known in the art as a means of converting the color of the light emitted from the emissive elements 114 to a different color.

As illustrated in FIG. 1B, each well has a first volume 120 drawn with cross-hatching and represented by well 106-m. The first volume 120 is defined with the well unpopulated by an emissive element. When populated with an emissive element 114, a second volume of material 122 fills each populated well, where the second volume is greater than the first volume. Note: the second volume 122 includes both the light modifier material and the emissive element.

Figure 2:
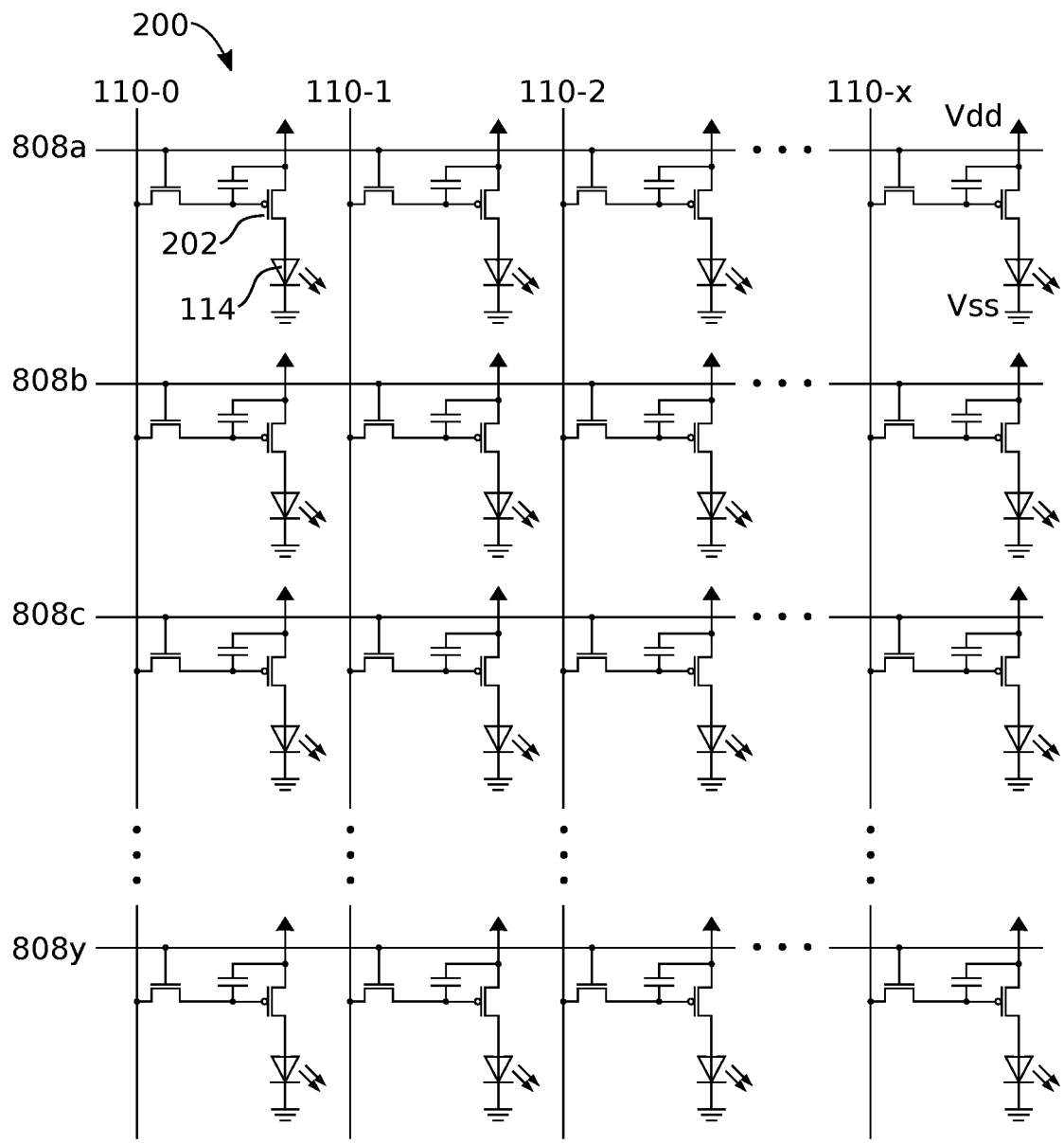
FIG. 2 is a schematic drawing depicting an emissive substrate with an active matrix (AM) of drive circuits.

FIG. 2 is a schematic drawing depicting an emissive substrate with an active matrix (AM) of drive circuits. As well understood in the art, the individual emissive elements are enabled (addressed) using the matrix of column and row traces to enable drive circuitry 200, which in turn enable the emissive elements 114, here depicted as light emitting diodes (LEDs). One particular simple variation of a drive circuit 200 is shown, but many types are known in the art. Each drive circuit 200 is connected to a corresponding column/row intersection, with an output connected to an electrical interface formed in the bottom of a corresponding well, and thus to an emissive element. For example, drive circuit 200 is connected to column 108a and row 110-0. A network of reference voltage (e.g., ground) and dc power (Vdd) traces are also needed. The final output transistor 202 of the drive circuit controls the output of a corresponding LED 114 by changing the interposing variable resistance between the dc power trace (Vdd) and the LED. As explained in more detail below, in one aspect all the drive circuitry and supporting reference voltage and dc power traces are formed in the substrate prior to the deposition of the emissive elements, and all electrical connections to the emissive elements are made via electrical interfaces formed in the well bottom surfaces. In this manner, a metal interconnection layer need not be formed over the substrate top surface after the emissive element is deposited, which permits light modifier structures to be formed directly overlying the emissive elements in the wells.

Figure 3:
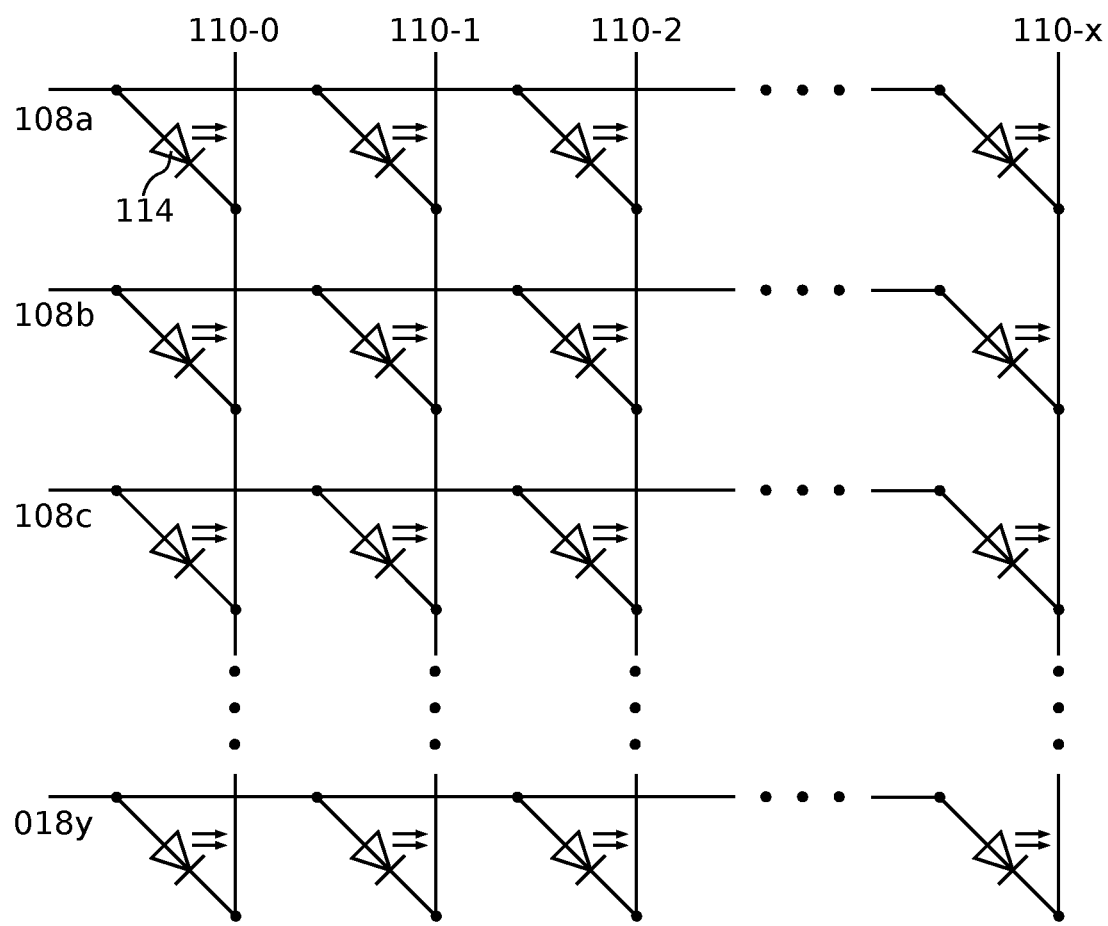
FIG. 3 is a schematic view of an emissions substrate where the emissive elements are enabled using a passive matrix (PM).

FIG. 3 is a schematic view of an emissions substrate where the emissive elements are enabled using a passive matrix (PM). In this aspect, a series of column traces and row traces form a passive matrix with the column trace of each column/row intersection is connected to at least a first electrical interface formed on a corresponding well bottom surface. In one aspect, the row trace of each column/row intersection is connected to a second electrical interface formed on the corresponding well bottom surface. In this manner, a metal interconnection layer need not be formed over the substrate top surface after the emissive element is deposited, which permits light modifier structures to be formed directly overlying the emissive elements in the wells. Additional details of active and passive matrices are provided in parent application Ser. No. 15/410,001, which is incorporated herein by reference.

Figure 4:
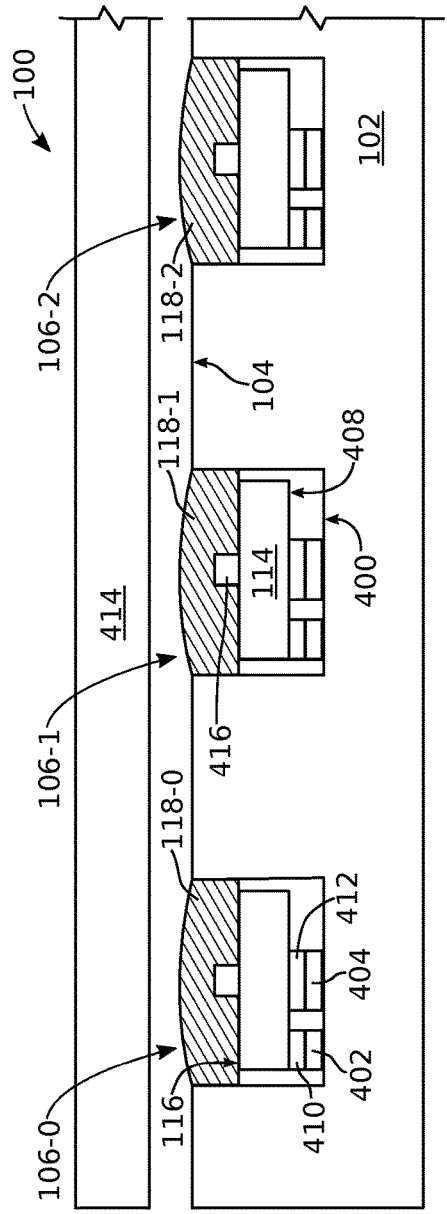
FIG. 4 is a partial cross-sectional view of an emissive substrate enabled with surface mount emissive elements.

FIG. 4 is a partial cross-sectional view of an emissive substrate enabled with surface mount emissive elements. Each emissive substrate well (106-0 through 106-2) has a bottom surface 400 with a first electrical interface 402 formed on the bottom surface and a second electrical interface 404 formed on the bottom surface, operatively connected to a corresponding column/row intersection. For clarity the column and row traces are not shown in this figure, see FIG. 1A. By "operatively connected" it is meant that the emissive elements 114 are connected to the column and row traces via either a passive or active matrix, as described above. Each emissive element 114 is a surface mount emissive element with a top surface 408 overlying a corresponding well bottom surface 400, with a first electrical contact 410 formed on the emissive element top surface, which is electrically connected to the first electrical interface 402. A second electrical contact 412 formed on the emissive element top surface 408 is electrically connected to the second electrical interface 404. In this aspect the emissive element 114 comprises a post 416, the function of which is explained in parent application Ser. No. 15/410,001. The light modification structures 118-0 through 118-2 are formed overlying the emissive element bottom surfaces 116 without an intervening emissive element metal interconnection layer formed overlying the substrate top surface 104. In one aspect as shown, an electrically inert passivation layer 414 overlies the emissive substrate top surface 104 and light modifier structures 118-0 through 118-2.

Figure 5A:
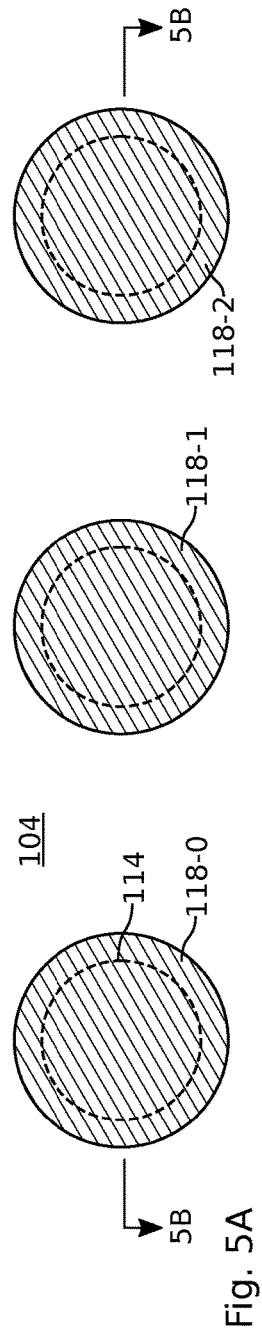
FIGS. 5A and 5B are, respectively, plan and partial cross-sectional views depicting the emissive substrate of FIG. 1 in greater detail.
Figure 5B:
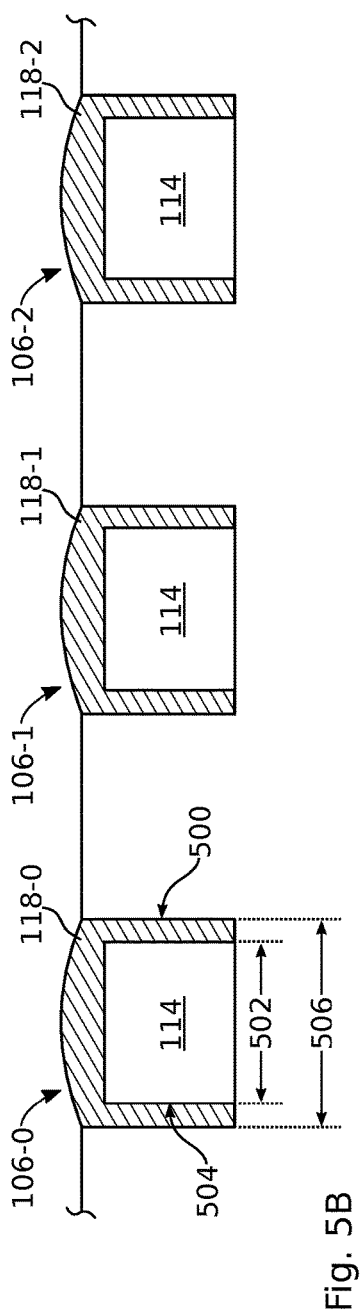

FIGS. 5A and 5B are, respectively, plan and partial cross-sectional views depicting the emissive substrate of FIG. 1 in greater detail. Each well 106-0 through 106-2 has a first shape with sidewalls 500 and a first perimeter 502. In these figures the first shape is depicted as circular, but the shape is not necessarily so limited, and may be other shapes such as oval or rectangular. Each emissive element 114 is formed as a disk with the first shape, with sides 504 and a second perimeter 506 less than the first perimeter 502. The printed light modifier structures 118-0 through 118-2 fill the space between the emissive element sides 504 and the well sidewalls 500. As a result, the printed light modifier structures 118-0 through 118-2 have the circular shape with the first perimeter 502 defined by the well sidewalls That is, the shape of the well helps define the shape of the light modifier structure. Alternatively stated, the well sidewalls 500 prevent the light modifier material from spreading out over then substrate top surface where it could potential interfere with adjacent light modifier structures.

A substrate such as glass is supplied onto which a metal electrode (or electrodes) is patterned by standard photolithographic methods. A well layer is typically deposited over the substrate several microns in thickness with the exact thickness determined by the thickness of the emissive element. The well layer is patterned by photolithographic methods. An emissive element is fluidically assembled into the well structure and attached to the bottom electrode layer through a solder process. In one aspect of this structure the emissive element has two electrodes on its top surface in contact with the bottom electrode layer. The bottom surface of the emissive element may also have a post (shown in FIG. 4) that aids in the oriented assembly of the emissive element into the well structure. There is also space between the emissive element and walls of the well, as the well diameter is greater than the diameter of the emissive element, so that it fits into the well. One method for depositing the light modifier structures is by inkjet printing an ink composed of a matrix material and the quantum dot particles. The matrix material can be any number of liquid materials that transmit light and form a solid after a curing step. This curing step can be by application of heat or ultraviolet (UV) radiation for example. The well is filled with the ink and the presence of the well helps to define and confine the ink to the subpixel area that it is intended to cover. Without the well, the ink would flow on the substrate to a diameter as determined by the surface energies of the liquid ink, substrate surface, and the air interface. The presence of the well edge acts to pin the ink in place so limit the spread. In this way a volume of QD ink greater than the empty volume of the well can be contained within a subpixel area. This volume, in conjunction with the QD concentration in the ink, converts more of the high energy light (e.g., blue light from a gallium nitride (GaN LED) into other wavelengths (e.g., lower energy green and red wavelengths) producing a better color gamut.

FIGS. 6A through 6C are diagrams depicting the ink volume of a wettable liquid pinned against the edge of a structure. As shown in FIG. 6A, after printing, liquid phase light modifier material 118 fills the well 106 with a surface level 602 extending above the level 606 of substrate 600 top surface. In FIG. 6B, after some evaporation the light modifier material surface level 608 is below the level of surface level 606, with a meniscus that is still just in contact with the well corner, forming a critical angle 604. FIG. 6C shows the light modifier surface level 610 after further evaporation, forming angle 612 (same as angle 604) with respect to the well sidewall. These figures, especially FIG. 6A, illustrate that the surface tension of the substrate material and the viscosity of the ink work to prevent the ink from overflowing a well into which the ink is deposited.

As light emitted from a QD light modifier structure (color conversion layer) is isotropic, another aspect of light modification deals with effectively scattering the light emitted from emissive elements with no color conversion layer (e.g., a blue LED) such that it is also emitted isotropically to match the emission from the red and green (color converted) subpixels. The process of forming such a light diffusion layer is the same as the color conversion layer described in the previous paragraph. That is, the light scattering ink takes the place of the QD ink when deposited in non-color converting (e.g. blue) sub-pixel wells only. The ink is again made of a liquid material that transmits light and forms a solid after curing. The scattering particles may be high index nanoparticles made from titanium oxide ($TiO_2$) for example, or high index polymer spheres for example. Light is scattered by these particles in all directions. Pinning of this ink works in the same manner as described above.

Figure 8A:
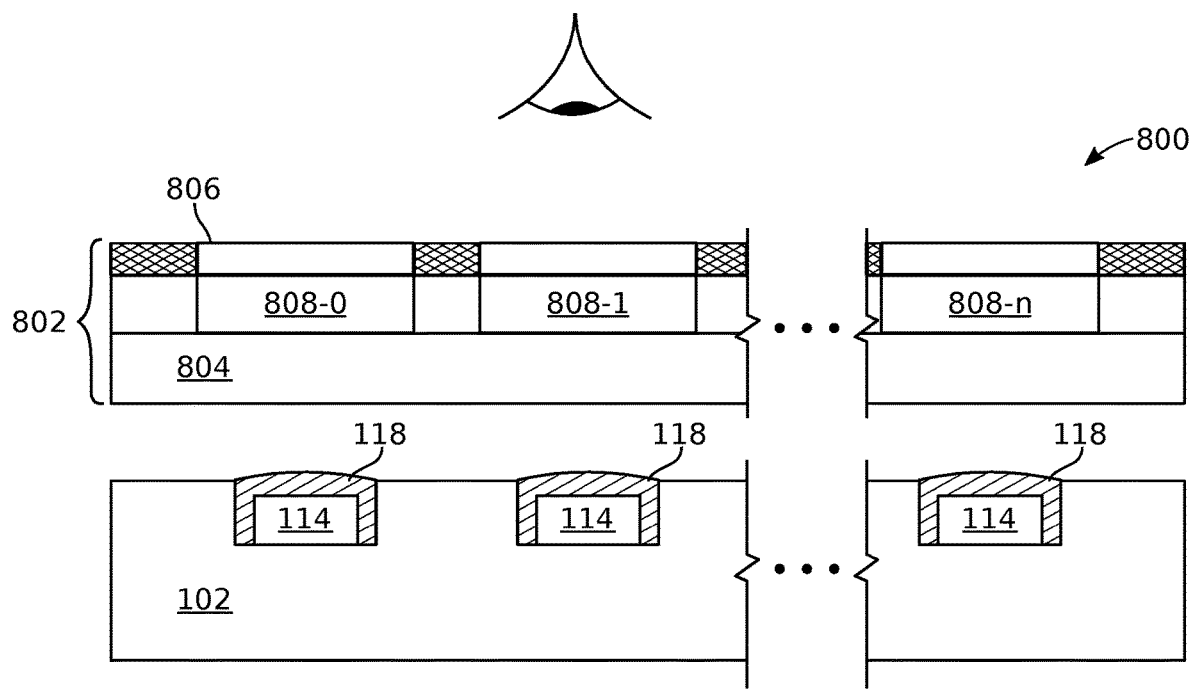
FIGS. 8A and 8B are, respectively, a partial cross-sectional views of a liquid crystal display, and a color-modified emissive element in detail.
Figure 8B:
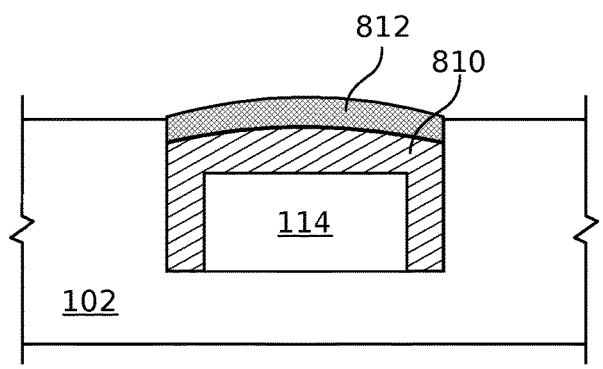

FIGS. 8A and 8B are, respectively, a partial cross-sectional views of a liquid crystal display, and a color-modified emissive element in detail. The display 800 comprises a liquid crystal display (LCD) substrate 802 including red-green-blue (RGB) color pixels emitting light, respectively, at wavelengths approximately centered at 630 nanometers (nm), 530 nm, and 450 nm. For simplicity, the LCD substrate 802 is depicted as comprising an LCD layer 804, which acts to gate the light from the underlying emissive substrate to individually addressed color sub-pixels 808-0 through 808-$n$ in a color filter layer 806. LCD displays are widely known and the art, and a detailed explanation of LCD should not be necessary for those skilled in the art. In this aspect the emissive substrate 102 acts as backlight for the LCD substrate 802. In one aspect, the emissive elements 114 are blue light-emitting light emitting diodes (LEDs). The light modifier structures 118 overlying the LEDs 114 convert blue light to white light using phosphor or QD color conversion materials. Explicitly, either a combination of red and green color conversion materials are used, or a yellow color conversion material is used.

The emissive substrate backlight may also be referred to as a local dimming backlight unit (BLU). The BLU acts as a low resolution copy of the display image to increase dynamic range by better matching the output of the backlight to the requirements of the image. In one aspect noted above, one simple version of the BLU is a uniform coating of white light color conversion (i.e., yellow) phosphor. A more sophisticated version (FIG. 8B) might use a layer of a red color conversion material 810 printed over the LED 114, followed by a coating of green color conversion material 812. Depositing the green layer over the red layer helps by limiting the absorption of green light in the red converter. However, a uniform coating over the whole substrate with mixed red and green converters is also effective, albeit at a higher cost.

FIG. 7 is a flowchart illustrating a multi-color emissive display fabrication method. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 700.

Step 702 provides an emissive substrate comprising a top surface, with a plurality of wells formed in the emissions substrate top surface, and a plurality of emissive elements populating the wells. Each emissive element has a bottom surface, see FIG. 1A. Step 704 prints light modifier structures overlying the emissive element bottom surfaces. For example, the light modifier structures may be formed using an inkjet printing process, although other printing processes are possible. The light modifier material may be light scattering materials, phosphors, or QDs. Phosphor and QDs for color conversion are well known in the art. The light scattering material may be a high refractive index titanium oxide nanoparticles or high refractive index polymer spheres for example.

In one aspect, Step 702 provides an emissive substrate with wells having a first shape, sidewalls, and a first perimeter. Step 702 also provides emissive element having the first shape, with sides and a second perimeter, less than the first perimeter. Then, Step 704 prints light modifier structures by filling a space between the emissive element sides and the well sidewalls with light modifier material. If the first shape is circular, Step 704 prints the light modifier structures overlying the emissive elements in the circular shape, such that the light modifier structures have a first diameter defined by the well sidewalls.

In another aspect, printing the light modifier structures in Step 704 includes substeps. Step 704a prints a liquid phase mixture of matrix material with QDs, phosphor, or light scattering materials, and Step 704b anneals the emissive substrate to cure the matrix material. Some examples of matrix materials include silicon, acrylic, and epoxy. Alternatively, Step 704c may deposit a liquid phase light modifier material overlying the wells, and 704d defines the liquid phase light modifier material shape in response to the shape of the underlying well.

In yet another aspect, Step 702 provides emissive substrate wells having a first volume, as defined when the well is not populated with an emissive element, and Step 704 fills each populated well with enough light modifier material to form a second volume, where the second volume is greater than the first volume and includes both the volume of the light modifier material and the emissive element.

A multi-color emissive display with light modifier structures has been provided. Examples of particular material, circuit layouts, and process steps have been presented to illustrate the invention. However, the invention is not limited to merely these examples. Other variations and embodiments of the invention will occur to those skilled in the art.

We claim:

1. A multi-color emissive display comprising:
   an emissions substrate comprising:
     a top surface;
     a plurality of wells formed in the emissions substrate top surface;
     a matrix of column and row conductive traces forming a first plurality of column/row intersections, where each column/row intersection is connected to an electrical contact of a corresponding well;
     a plurality of emissive elements populating the wells, each emissive element having a bottom surface;
   printed light modifier structures overlying a plurality of the emissive element bottom surfaces, wherein the printed light modifier structures comprise a material selected from a group consisting of high refractive index polymer spheres, phosphors, and quantum dots (QDs).

2. The display of claim 1 wherein each well has a cross-sectional area with a first shape, sidewalls orthogonal to the cross-sectional area, and a first perimeter around the sidewalls;
   wherein each emissive element is formed with a cross-sectional area having the first shape, sides orthogonal to the emissive element cross-sectional area, and a second perimeter around the sides, less than the first perimeter; and,
   wherein the printed light modifier structures fill a space between the emissive element sides and the well sidewalls.

3. The display of claim 2 wherein the first shape is circular.

4. The display of claim 2 wherein the printed light modifier structures have a cross-sectional area with the first shape, sides orthogonal to the printed light modifier structure cross-sectional area, and a first perimeter around the printed light modifier structures defined by the well sidewalls.

5. The display of claim 1 wherein each emissive substrate well has a bottom surface with a first electrical interface formed on the bottom surface and a second electrical interface formed on the bottom surface, both operatively connected to a corresponding column/row intersection;
   wherein each emissive element is a surface mount emissive element with a top surface overlying a corresponding well bottom surface, with a first electrical contact formed on the emissive element top surface electrically connected to the first electrical interface, and with a second electrical contact formed on the emissive element top surface electrically connected to the second electrical interface; and,
   wherein the light modification structures are formed overlying the emissive element bottom surfaces without an intervening emissive element metal interconnection layer.

6. The display of claim 1 wherein each well has a first volume, as defined with the well unpopulated by an emissive element; and,
   wherein a second volume of material fills each populated well, where the second volume is greater than the first volume and includes the volume of the emissive element and the volume of the light modifier material.

7. The display of claim 1 further comprising:
   a liquid crystal display (LCD) substrate including red-green-blue (RGB) color pixels;
   wherein the emissive substrate is an LCD backlight;
   wherein the emissive elements are blue light-emitting light emitting diodes (LEDs); and,
   wherein the light modifier structures overlying the LEDs convert blue light to white light using phosphor or QD color conversion materials selected from the group consisting of either a combination of red and green color conversion materials or a yellow color conversion material.

8. A multi-color emissive display fabrication method, the method comprising:
   providing an emissive substrate comprising:
     a top surface, with a plurality of wells formed in the emissions substrate top surface, and a plurality of emissive elements populating the wells, each emissive element having a bottom surface with an electrical interface connected to an electrical contact on a well bottom surface; and,
   printing light modifier structures overlying the emissive element bottom surfaces, wherein the light modifier structures comprise a material selected from a group consisting of high refractive index polymer spheres, phosphors, and quantum dots (QDs).

9. The method of claim 8 wherein providing the emissive substrate wells includes providing wells having a cross-sectional area with a first shape, sidewalls orthogonal to the cross-sectional area, and a first perimeter around the sidewalls;
   wherein providing the emissive elements includes providing emissive element having a cross-sectional area with the first shape, sides orthogonal to the emissive element cross-sectional area, and a second perimeter around the sides, less than the first perimeter; and, wherein printing light modifier structures includes filling a space between the emissive element sides and the well sidewalls with light modifier material.

10. The method of claim 9 wherein the first shape is circular.

11. The method of claim 9 wherein printing the light modifier structures includes printing the light modifier structures having a cross-sectional area with the first shape.

12. The method of claim 11 wherein the light modifier structures have sides orthogonal to the light modifier structure cross-sectional area, with a first perimeter around the light modifier structure sides defined by the well sidewalls.

13. The method of claim 8 wherein printing the light modifier structures includes inkjet printing the light modifier structures.

14. The method of claim 8 printing the light modifier structures includes:
    printing a liquid phase mixture of matrix material with QDs or a phosphor; and,
    annealing the emissive substrate to cure the matrix material.

15. The method of claim 14 wherein the matrix material is selected from the group consisting of silicon, acrylic, and epoxy.

16. The method of claim 8 wherein printing the light modifier structures includes:
    depositing a liquid phase light modifier material overlying the wells; and,
    defining the liquid phase light modifier material cross-sectional area shape in response to the cross-sectional area shape of the underlying well.

17. The method of claim 8 wherein printing the light modifier structures includes:
    printing a liquid phase mixture of matrix material and light scattering materials; and,
    annealing the emissive substrate to cure the matrix material.

18. The method of claim 8 wherein providing the emissive substrate wells includes providing wells having a first volume, as defined with the well unpopulated by an emissive element; and,
    wherein printing the light modifier structure includes filling each well with enough light modifier material to form a second volume, where the second volume is greater than the first volume and includes both the volume of the emissive element and the volume of the printed light modifier material.

19. An emissive display comprising:
    an emissions substrate comprising:
        a top surface;
        a plurality of wells formed in the emissions substrate top surface;
        a matrix of column and row conductive traces forming a first plurality of column/row intersections in the substrate, where each column/row intersection is connected to an electrical contact of a corresponding well;
        a plurality of emissive elements populating the wells, each emissive element having a bottom surface, a top surface overlying a well bottom surface, and a post extending from the emissive element bottom surface;
    printed light modifier structures overlying a plurality of the emissive element bottom surfaces.

* * * * *